(12) United States Patent
Nakano

(10) Patent No.: US 8,947,773 B2
(45) Date of Patent: Feb. 3, 2015

(54) CATADIOPTRIC OPTICAL ELEMENT AND OPTICAL SYSTEM INCLUDING SAME

(75) Inventor: Masatsugu Nakano, Tucson, AZ (US)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 13/492,167

(22) Filed: Jun. 8, 2012

(65) Prior Publication Data

US 2013/0329282 A1    Dec. 12, 2013

(51) Int. Cl.
*G02B 17/00* (2006.01)

(52) U.S. Cl.
USPC .......................................................... 359/365

(58) Field of Classification Search
USPC ................... 359/364–365, 727–736
See application file for complete search history.

(56) References Cited

U.S. PATENT DOCUMENTS

| | | | |
|---|---|---|---|
| 2,683,394 A | 7/1954 | Polanyi et al. | |
| 5,650,877 A | 7/1997 | Phillips, Jr. et al. | |
| 5,930,055 A | 7/1999 | Eisenberg | |
| 6,493,156 B1 | 12/2002 | Oh et al. | |
| 2010/0188856 A1* | 7/2010 | Ford et al. | 362/299 |

FOREIGN PATENT DOCUMENTS

| | | |
|---|---|---|
| JP | H09-179199 A | 7/1997 |
| JP | 2002-230817 A | 8/2002 |
| JP | 2009-300994 A | 12/2009 |
| WO | 2008101676 A2 | 8/2008 |
| WO | 2008101676 A3 | 10/2008 |

OTHER PUBLICATIONS

Grey et al.,"A New Series of Microscope Objectives:I. Catadioptric Newtonian Systems", Journal of Optical Society of America, Sep. 1949, pp. 719-722, vol. 39, No. 9.
Burchroeder,"Application of Aspherics for Weight Reduction in Selected Catadioptric Lenses", Naval Electronics Systems Command, Jul. 1971, pp. 1-54.

* cited by examiner

*Primary Examiner* — Jennifer L. Doak
(74) *Attorney, Agent, or Firm* — Canon USA Inc. IP Division

(57) ABSTRACT

A catadioptric lens comprises, a first surface configured to introduce a ray within the catadioptric lens; and a second surface, with a reflective film, configured to reflect the introduced ray to the first surface; the second surface having a first reflection area and a second reflection area surrounded by the first reflection area, wherein the ray, which has been introduced from the first surface and has traveled to the first reflection area, is reflected on the first reflection area by total internal reflection, and the ray, which has been introduced from the first surface and has traveled to the second reflection area, is reflected by the reflective film.

10 Claims, 6 Drawing Sheets

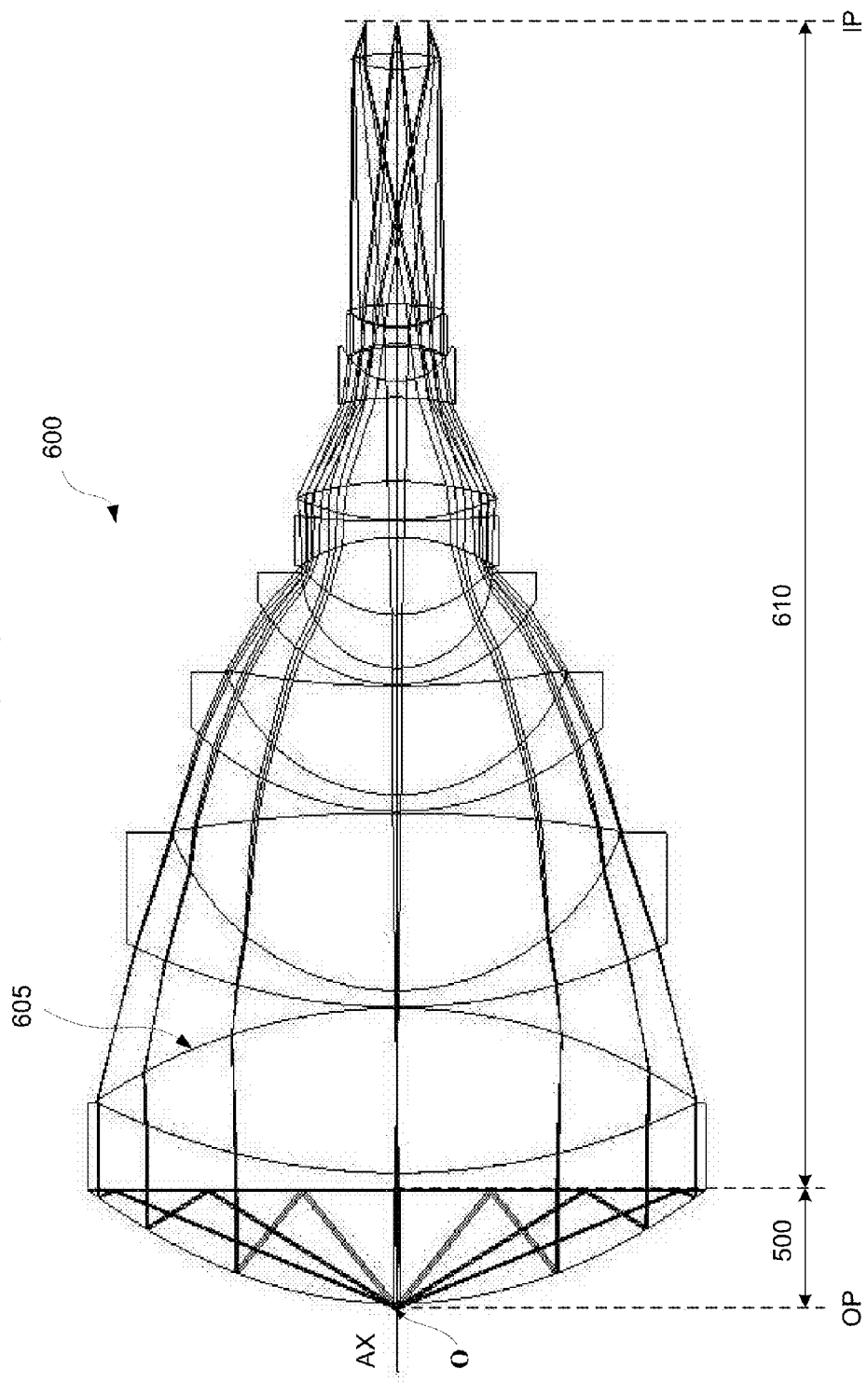

CATADIOPTRIC OPTICAL ELEMENT AND OPTICAL SYSTEM INCLUDING SAME

BACKGROUND OF THE INVENTION

1. Field of the Invention

The present invention is related to a catadioptric optical element, in particular a catadioptric lens, and to an optical system that includes the catadioptric optical element.

2. Description of the Related Art

Imaging apparatuses, such as a microscope, a lithographic projection system, or even a telescope, use purely reflective (catoptric), purely refractive (dioptric), or a combination of reflective and refractive (catadioptric) optical elements to image a specimen. A microscope uses an objective optical system to observe a sample, such as a biological tissue, a defect on a semiconductor wafer or a surface of material. A lithographic projection system uses a projection objective to project an image of a pattern on a reticle onto a planar image surface of a semiconductor substrate (wafer). In a telescope, an objective lens, larger in diameter than the pupil of a human eye, permits the collection of enough light to make visible distant point sources such as stars that otherwise may not be observed. To produce a good image, these instruments must collect enough light reflected from (or transmitted through) an object, separate the details in the image, magnify the image, and render the details visible to the human eye or an optical detector.

The ability to resolve fine object details at a fixed object distance, regardless of whether the details correspond to physically close features (as in a microscope) or to features separated by a small angle (as in a telescope), is determined by the instrument's resolution. Resolution (R) of a microscope is given by Equation (1).

$$R = 0.61 \times \frac{\lambda}{NA} \quad (1)$$

Where $\lambda$ is the wavelength of the light used, NA is the numerical aperture of the microscope on an object space, and 0.61 is derived from the Rayleigh criterion.

As it is known to those skilled in the art, the larger NA of the microscope is, the better the resolution is. Accordingly, from the above requirements of Equation (1), the minimum resolvable separation of two object points can be reduced (resolution improved) by increasing the lens diameter and decreasing the wavelength used. Hence, the advantage of using ultraviolet (UV), deep ultraviolet (DUV), X-ray, and electron microscopes (or projection objectives) for high-resolution applications.

On the other hand, NA is also determined by the instruments' ability to gather enough light to resolve fine object details. In terms of its ability to gather enough light, the NA of a microscope is defined by Equation (2), as follows.

$$NA = N_o \sin \theta_m \quad (2)$$

Where $\theta_m$ is the angle of marginal ray that comes from the object and $N_o$ is the refractive index of the object space. From the perspective of Equation (2), therefore, in order to obtain high NA, the marginal ray $\theta_m$ needs to be large. However, this results in more difficulty for correcting aberrations. On the other hand, increasing the refractive index of object space can also make NA larger. However, when air ($N_o = 1$) is used in the object space, the maximum value of NA cannot be greater than unity, but when the object space is filled with a fluid of index larger than 1 ($N_o > 1$) a NA larger than 1 can be achieved. Accordingly, most conventional microscopes use objectives with NA values in the approximate range of 0.08 to 1.30, with the proviso that NA values greater than 0.95 can typically be achieved only by using an immersion fluid in the object space.

Many designs for high NA objectives use a catadioptric system, which includes both refractive and reflective components. In particular, projection objectives for immersion lithography use a catadioptric optical element as a last optical element which serves as a field correcting optic to increase the NA value. See, for example, U.S. Pat. No. 5,650,877 and International Publication Number WO2008/101676 by Aurelian Dodoc (herein "WO2008/101676").

In U.S. Pat. No. 5,650,877, a reducing optical element having specially configured front and back faces projects a reduced image of the reticle onto a substrate. The back face of the reducing optical element has a central aperture surrounded by a concave reflective surface. The front face has a partially reflective surface that transmits a portion of the light beam toward the concave reflecting surface and reflects a portion of the remaining light beam returned by the concave reflective surface on a converging path through the central aperture. The substrate is aligned with the aperture.

WO2008/101676 discloses a catadioptric optical element made of a high-index transparent material having a first surface on an object-side of the element and a second surface opposite to the first surface. The second surface has a transmissive portion in a central region around the optical axis and a concave reflective portion in a zone around the transmissive portion. The first surface has a transmissive zone to transmit radiation coming from the object surface towards the second surface and oriented relative to the second surface such that at least a portion of radiation reflected by the reflective portion of the second surface is totally reflected by the transmissive portion of the first surface towards the transmissive portion of the second surface.

In addition, Grey et al., in an article entitled "A New Series of Microscope Objective: I. Catadioptric Newtonian Systems," JOSA 39, No 9, 719-723 (1949), discloses a microscope objective with a last solid lens made of fluorite or quartz-fluorite, where both object-side and image-side surfaces of the lens contain reflective coating on certain regions thereof to achieve NA values greater than 0.95 at 220 to 540 nm wavelengths with negligible aberrations.

One feature common to each of the above discussed references is that a central obscuration blocks a portion of the light from passing through the central region of the objective's catadioptric optical element. The central obscuration beyond a certain threshold (typically 25%) can cause significant degradation in image contrast and loss of light intensity. According to U.S. Pat. No. 5,650,877, the central obscuration may be limited in size to block no more than 15 percent of the projected image. However, although obscuration is relatively low, substantial energy loss is caused by partial reflection.

In the catadioptric optical element of WO2008/101676, total internal reflection (TIR) is used to increase the NA. To properly visualize the physical conditions for total internal reflection, FIG. 1 illustrates the geometry of rays refracted at a plane interface of a first medium of refractive index n1 and a second medium of refractive index n2. Referring to FIG. 1, consider a light ray R1 originating at an object point O and having an incidence angle $\theta_1$ incident on a plane interface S between the first medium of refractive index n1 and the second medium of refractive index n2. Upon transmitting through the first medium of refractive index n1 to the second medium of refractive index n2, the light ray R1 will be refracted as a light ray R1' at an angle of refraction $\theta_2$, in accordance with Snell's law.

Snell's law, which takes the form, n1 sin θ₁=n2 sin θ₂, requires an angle of refraction θ₂ such that the refracted ray R1' bends away from the normal Nr when n1>n2 (as illustrated in FIG. 1), or the refracted ray bends towards the normal when n2>n1 (not illustrated). Snell's law also requires that a ray R0 having an incidence angle θ₁=0 (i.e., incident perpendicular or normal) to the interface S be transmitted without change in direction, regardless of the ratio of refractive indices. As illustrated in FIG. 1, rays R1 and R2 that make increasingly larger angles of incidence θ₁ with respect to the normal Nr must, by Snell's law, refract at increasingly larger angles θ₂ as refracted rays R1' and R2', respectively.

A critical angle of incidence θ$_c$ is reached when a ray R3 is incident on the interface S at this critical angle θ$_c$. In this case, the light ray is refracted as ray R3' at an angle of refraction that reaches 90 degrees with respect to the normal Nr. Thus, from Snell's law, when θ₂=90°, the critical angle θ$_c$=arcsin (n2/n1). Accordingly, it holds that for angles of incidence greater than θ$_c$, the incident ray R4 is not refracted, but it is instead reflected as R4' because it experiences total internal reflection (TIR).

In consideration of the above premise, total internal reflection of light rays occurs between a lens and air, if Snell's law conditions are satisfied for the critical angle θ$_c$ given by Equation (3).

$$\theta_c = \arcsin\left(\frac{1}{N}\right) \quad (3)$$

where N is the refractive index of the lens, and 1 is the assumed refractive index of air.

Referring now to FIG. 2, relevant portions of a catadioptric lens disclosed by WO2008/101676 are discussed. In FIG. 2, a side view of a catadioptric lens 100, which has a first surface 101 and a second surface 102 opposite to each other, is illustrated on the left side of the drawing. The first surface 101 is generally concave when seen from the side of the second surface 102, and the second surface 102 is substantially planar (flat). A front view of the substantially planar second surface 102 is illustrated on the right side of FIG. 2. The first surface 101 has a transmissive portion in a central region around the optical axis AX and a concave reflective portion in a region around the transmissive portion. The second surface 102 is generally transparent and has a total internal reflection (TIR) region 106 and transmissive region 107, which are concentric to each other and also centered on the optical axis AX. Light illuminating an object O passes through the transmissive portion of the first surface 101 and impinges first on the second surface 102. More specifically, light rays R1 and R2 having angles of incidence between the critical angle θ$_c$ and the marginal angle θ$_m$ undergo total internal reflection on the TIR region 106 of the second surface 102, and are therefore reflected towards the reflective portion of the first surface 101. In turn, the reflective portion of the first surface 101 reflects these rays back towards the second surface 102 as light rays R1' and R2'. This time, however, since the incident angles of rays R1' and R2' are less than the critical angle, the rays R1' and R2' are transmitted through the TIR region 106 of the second surface 102.

On the other hand, a light ray R0 propagating through the transmissive region of the first surface 101 and impinging on the transmissive region 107 of the second surface 102, with an incident angle θ$_l$ less than the critical angle θ$_c$, cannot be reflected by the second surface 102, but instead is refracted as a light ray R0'. The refracted ray R0' may be scattered or blocked by a central obscuration or field stop aperture; thus, light rays R0 with an incident angle θ$_l$ less than the critical angle θ$_c$ do not contribute to image formation. Moreover, the transmissive region 107 immediately around the optical axis AX is obscured because the object itself blocks light incident normal to the object. The region 107, therefore, may degrade image contrast and cause loss of energy of the light.

Generally, an obscuration ratio, which shows how much illumination light rays are lost in a high NA system, is defined by the Equation (4).

$$\text{Obscuration} = \frac{\sin \theta_l}{\sin \theta_m} \quad (4)$$

where θ$_l$ is the lowest angle to achieve the required obscuration ratio. The rays R0 below the critical angle θ$_c$ which reach the region 107 in FIG. 2 are not reflected but refracted which is not desirable. In WO 2008/101676, therefore, obscuration is given by Equation (5), as shown below:

$$\text{Obscuration} = \frac{\sin\left\{\arcsin\left(\frac{1}{N}\right)\right\}}{\sin \theta_m} \quad (5)$$

Therefore, since θ$_l$ is smaller than the critical angle θ$_c$, it means that the requirement for obscuration may not be satisfied.

Accordingly, there is a need to improve on the current state of the art, so that catadioptric optical systems may provide the highest possible numerical aperture with the lowest obscuration ratio, without sacrificing image quality.

SUMMARY OF THE INVENTION

According to an aspect of the present invention, a catadioptric optical element comprises, a first surface configured to introduce a ray within the catadioptric lens; and a second surface, with a reflective film, configured to reflect the introduced ray to the first surface, the second surface having a first reflection area and a second reflection area surrounded by the first reflection area, wherein the ray, which has been introduced from the first surface and has traveled to the first reflection area, is reflected on the first reflection area by total internal reflection, and the ray, which has been introduced from the first surface and has traveled to the second reflection area, is reflected by the reflective film.

Further features of the present invention will become apparent from the following description of exemplary embodiments with reference to the attached drawings.

BRIEF DESCRIPTION OF THE DRAWINGS

FIG. 8 illustrates an imaging optical system incorporating therein catadioptric optical element, in accordance with the present invention.

DESCRIPTION OF THE EMBODIMENTS

Embodiments according to the present invention will be described below with reference to the attached drawings.

Figure 3:
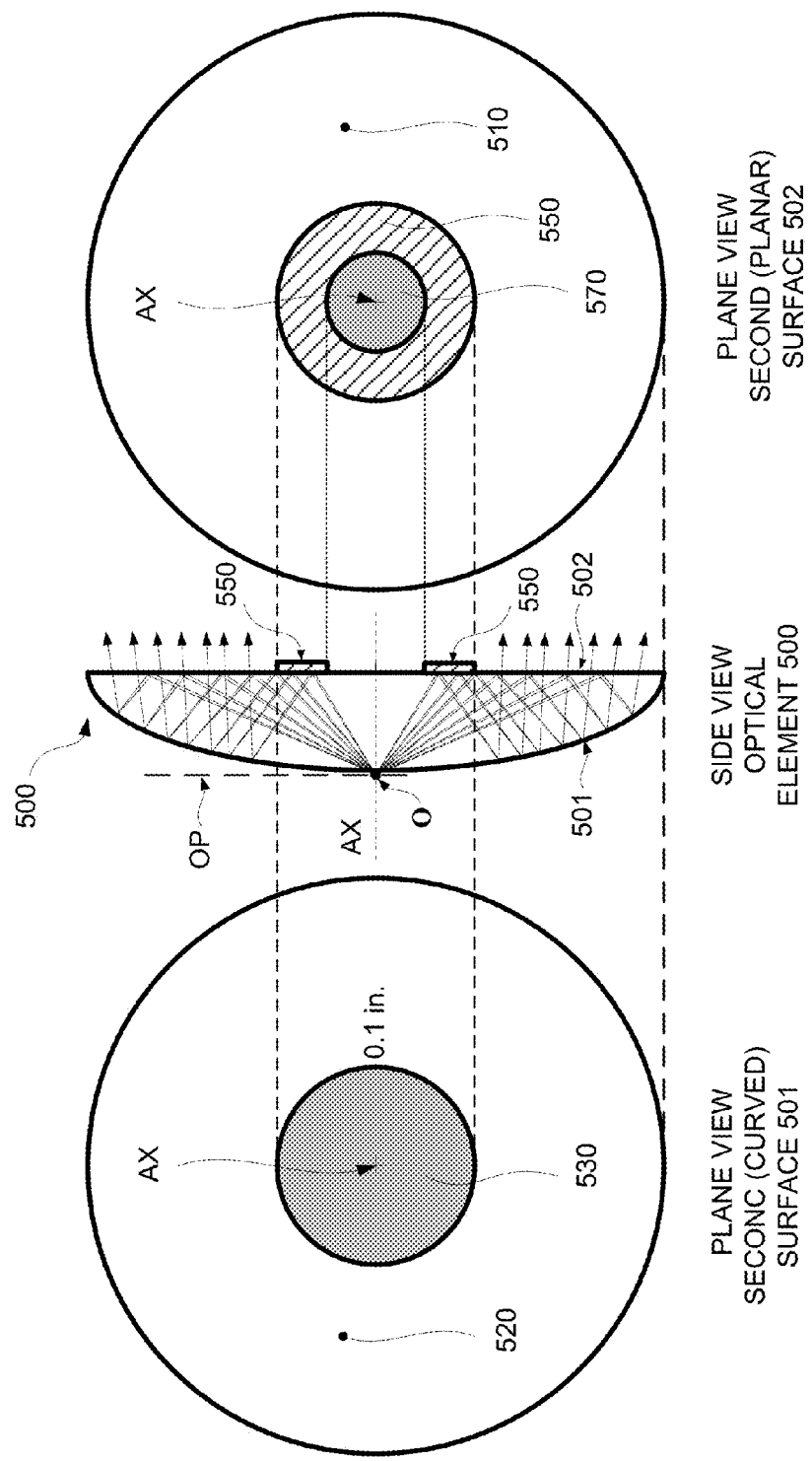
FIG. 3 illustrates a catadioptric optical element in accordance with an embodiment of the present invention.

FIG. 3 illustrates a catadioptric optical element 500 having a first surface 501 and a second surface 502 opposite to the first surface in accordance with a first embodiment of the present invention. The second surface 502 is a non-curved, substantially flat or planar surface. The first surface 501 is a curved surface and can have either a spherical or aspherical shape. In the embodiment illustrated in FIG. 3, when seen from the side of the second surface 502, the first surface 501 is concave towards the second surface. In the present embodiment, therefore, the optical element 500 is a solid lens shaped as a plano-convex lens. However, the present invention is not limited to a solid lens per se. Instead, the optical element 500 may also be implemented by a combination of a mirror and a lens, or a combination of cemented lenses with appropriate reflective surfaces therein. In addition, instead of a plano-convex, the optical element 500 may also be shaped as a biconvex or meniscus lens having spheric or aspheric surfaces.

As illustrated in FIG. 3, a plane view of the curved first surface 501 (front view) of the optical element 500 is shown on the left-most section of the figure. A plane view of the planar second surface 502 (back view) of the optical element 500 is shown on the right-most section of the figure. And, a side view of the optical element 500 is shown in the center section of the figure. Referring to the side view of the optical element 500, the left side thereof may be referred to as the front or object-side, whereas the opposite side thereof (right side) may be referred to as the back or image side. Therefore, as used herein, the side of an optical element 500 where the object to be imaged is placed is interchangeably referred to as the "object-plane side", "object side", or "front side" of the optical element; and the side of the optical element 500 where the image is formed is interchangeably referred to as the "image-plane side", "image side" or "back side" of the optical element.

As shown in FIG. 3, the first surface 501 (object side surface) is divided into a circular transmissive portion 530 (object-side transmissive portion) centered the optical axis AX and a reflective portion 520 (object-side reflective portion) in a rotationally symmetric zone around the circular transmissive portion 530. The circular transmissive portion 530 centered on the optical axis AX is an optically transparent (transmissive) region and serves to transmit therethrough light originated at an object O disposed on the optical axis AX and located at an object plane OP. Al least the reflective portion 520 of the first surface 501 has a curved shape concave towards the image side thereof (concave towards the second surface 502). The reflective portion 520 is preferably coated with a highly reflective coating (film) to form what can be considered a concave mirror. That is, the reflective portion 520 is an area of the optical element 500 (lens) in an outer region thereof coated with a reflective coating film, and the circular transmissive portion 530 is an area concentric to the optical axis AX not coated with the reflective coating film. Optionally, the circular transmissive region 530 may be coated with an anti-reflection coating (film) to increase transmission of light rays from the object O to the second surface 502.

On the other hand, the planar second surface 502 of the optical element 500 is divided into a central transmissive region 570 (image-side transmissive portion) also centered on the optical axis AX, a ring-shaped reflective region 550 (image-side reflective portion) in a rotationally symmetric zone around the central transmissive region 570, and a total internal reflection (TIR) region 510 (image-side TIR portion) in a rotationally symmetric region around the ring-shaped reflective region 550. At least the central transmissive region 570 and the TIR region 510 are transparent devoid of any coatings, so as to transmit light incident thereupon at predetermined incidence angles. The ring-shaped reflective region 550 is preferably coated with a highly reflective coating similar to that of the reflective portion 520 of the first surface 501.

More specifically, as illustrated in FIG. 3, the ring-shaped reflective region 550 includes and area of the second surface 502, in a rotationally symmetric zone around the central transmissive region 570 and within the TIR region 510. The ring-shaped reflective region 550 preferably has a reflective coating film and serves to extend a reflective portion of the second surface 502 beyond the TIR region 510. As explained in further detail below, the area of the ring-shaped reflective region 550 is associated with and determined by the critical angle $\theta_c$ and a lowest angle $\theta_l$ necessary for satisfying a required obscuration ratio.

Referring again to the side view of the optical element 500 in FIG. 3, light rays illuminating an object O pass through the circular transmissive portion 530 of the first surface 501 and impinge on the second surface 502. As discussed supra, in the Background section of this specification, it is a conventional technique to allow light rays impinging on the second surface 502 at an incident angle smaller than the critical angle $\theta_c$ not to be reflected, but to be refracted (transmitted) therethrough. These refracted rays may degrade image contrast or cause loses of light intensity, thereby degrading the imaging capability of the optical element. In contrast, in accordance with the first embodiment of the present invention, light rays impinging on the second surface 502 at an incident angle smaller than the critical angle $\theta_c$ and greater than a lowest angle $\theta_l$ necessary for satisfying a required obscuration ratio are actually totally reflected from the second surface 502. Hereinafter $\theta_l$ will be referred to as "the lowest obscuration angle". In this manner, the light rays impinging on the second surface 502 at an incident angle smaller than the critical angle $\theta_c$ and greater than the lowest obscuration angle $\theta_l$ also contribute to image formation. As a result, improved image contrast and optimal light intensity can be advantageously achieved to obtain high-quality images essentially free of optical aberrations.

Figure 4:
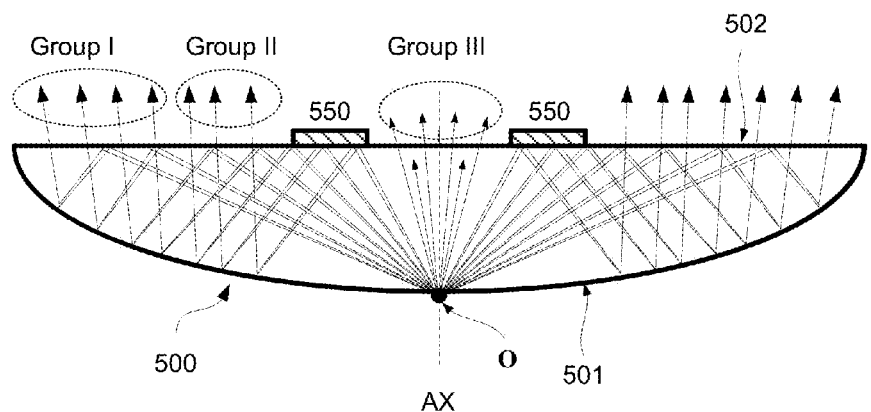
FIG. 4 illustrates a side view of the catadioptric optical element with an exemplary ray-tracing therein, in accordance with the present invention.
Figure 5:
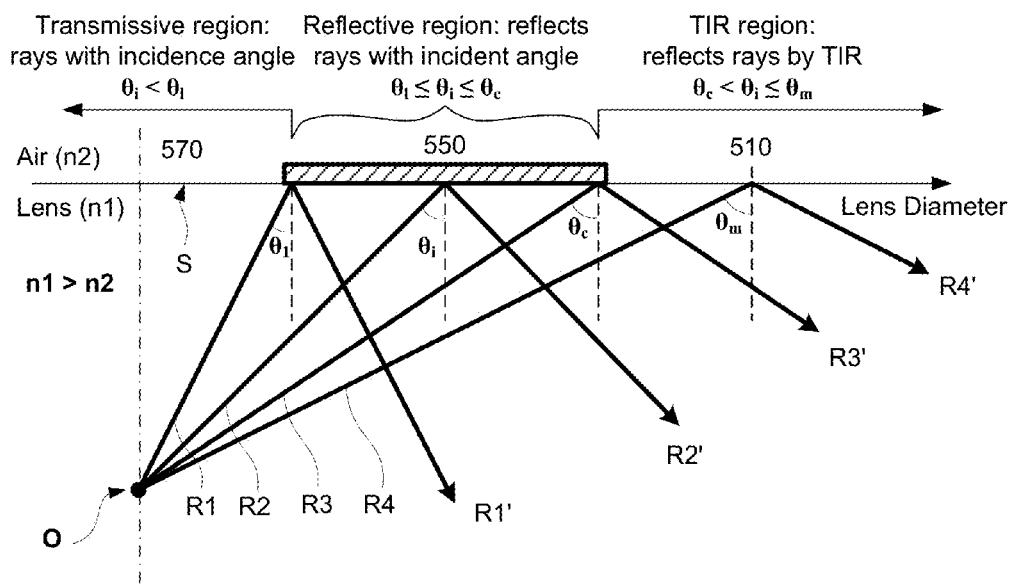
FIG. 5 illustrates the geometry of rays reflected at a plane interface between the second surface of the catadioptric optical element and a medium surrounding the second surface.

Turning now to FIGS. 4 and 5, operation of the catadioptric optical element 500, in accordance with the present invention, will be explained in detail. FIG. 4 illustrates the side view of the optical element 500 with an exemplary ray-tracing therein; and FIG. 5 illustrates the geometry of rays reflected at a plane interface S between the second surface 502 of optical element 500 and a medium (air) in contact with the second surface 502. More specifically, as illustrated in FIG. 4, for ease of illustration, the ring-shaped reflective region 550 is shown as a reflective film overlaid on second surface 502. As illustrated in FIG. 5, the ring-shaped reflective region 550 is configured to totally reflect rays incident thereon at an incident angle equal to or smaller than the critical angle $\theta_c$ and equal to or larger than the lowest obscuration angle $\theta_l$.

The ring-shaped reflective region 550 (second-surface reflective region) may be formed by coating the corresponding part of second surface 502 with a highly reflective film. Alternatively, the ring-shaped reflective region 550 may be formed by adding (e.g., attaching or cementing) a ring-shaped mirror to a corresponding part of the second surface 502. The ring-shaped reflective region 550 may be further formed by constructing (e.g., by lithographically etching or laminating by chemical vapor deposition) a ring-shaped reflective grating on a corresponding part of the second surface 502. In the case where a reflective grating is used for the ring-shaped reflective region 550, the reflective grating can be tailored to specific wavelengths or angles of reflection that can fulfill the requirements of improved image contrast and minimized obscuration ratio. It is envisioned that persons having ordinary skill in the art will recognize, without undue experimentation, other equivalent manners in which the ring-shaped reflective region 550 can be formed. Accordingly, the embodiments of the present invention are not limited to any specific manner in which the ring-shaped reflective region 550 may be formed.

FIG. 5 particularly illustrates the geometry of light rays refracted at a plane interface of the ring-shaped reflective region 550. Referring to FIG. 5, it should be recalled from the Background section supra that for a light ray R4 incident on the interface S at an incidence angle greater than the critical angle $\theta_c$, the incident ray R4 undergoes TIR at the TIR region 510 of the second surface 502, and is reflected as light ray R4'. Thus, the TIR region 510 is configured to reflect by total internal reflection rays of light incident thereupon at an incidence angle $\theta_i$ greater than the critical angle $\theta_c$ and equal to or smaller than a marginal angle $\theta_m$.

Figure 1:
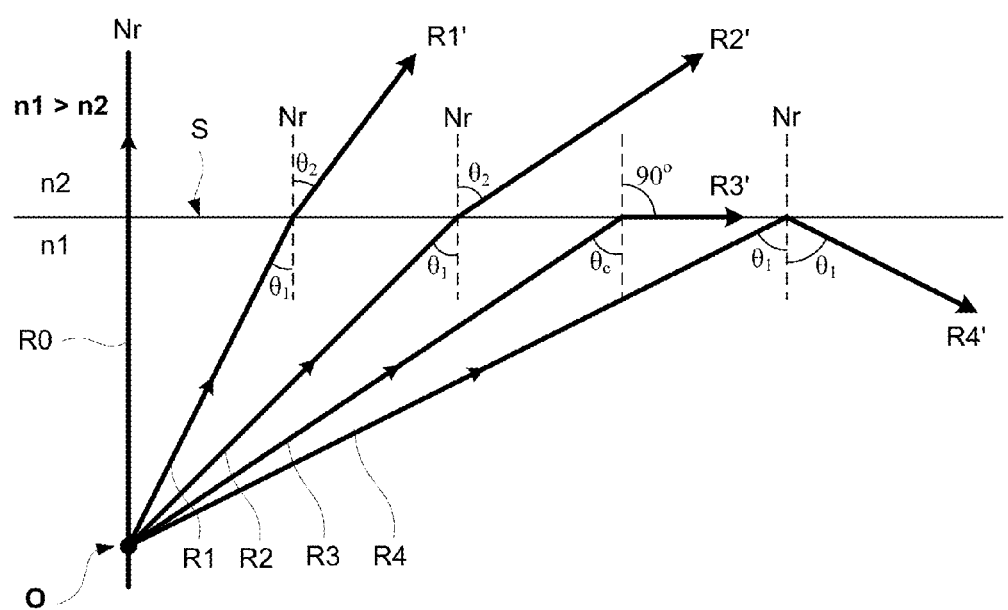
FIG. 1 illustrates the geometry of rays refracted at a plane interface of a first medium of refractive index n1 and a second medium of refractive index n2, where n1>n2.
Figure 2:
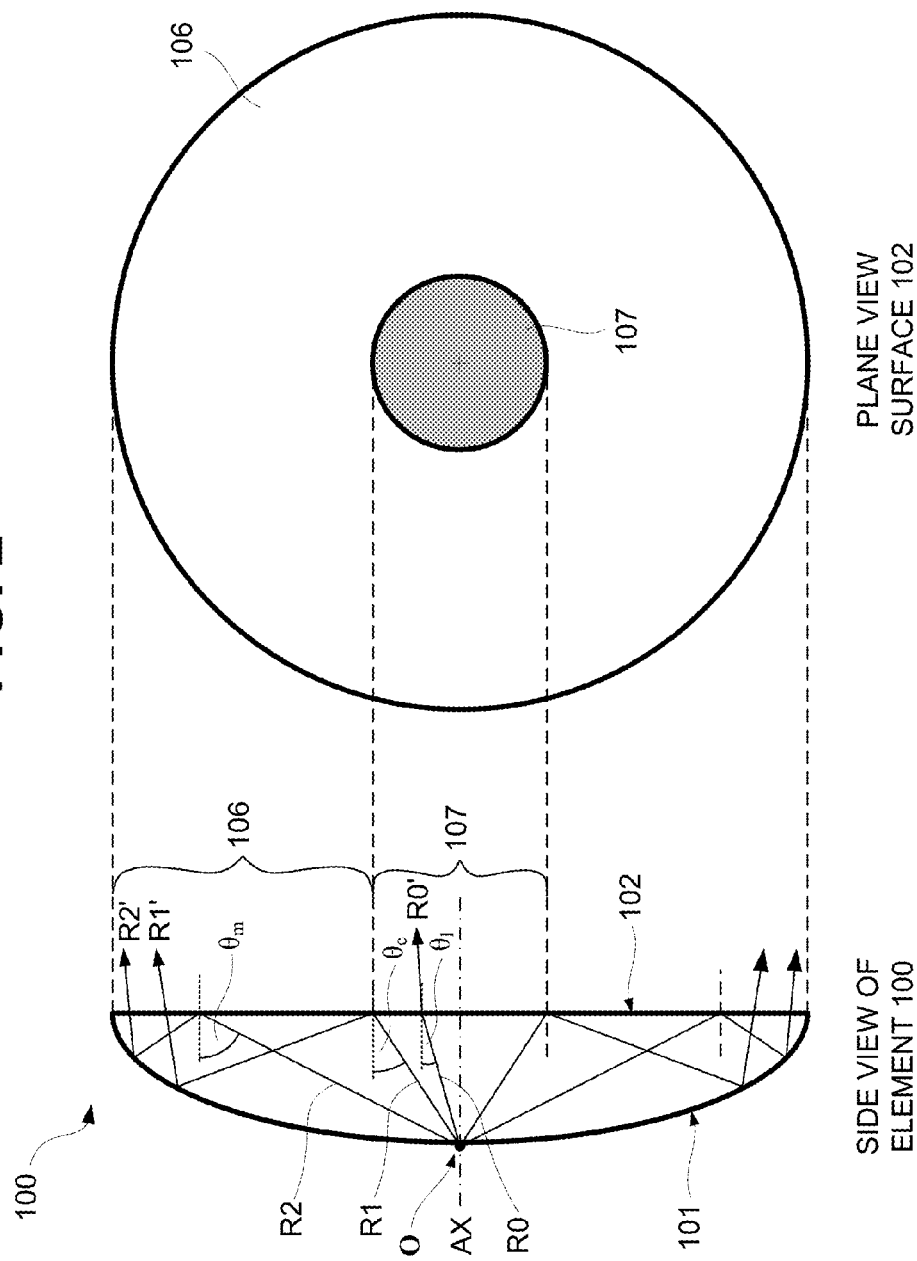
FIG. 2 illustrates relevant portions of a conventional catadioptric lens.

Unlike the conventional art (see FIGS. 1 and 2), as illustrated in FIG. 5, light rays R1, R2 and R3 having an incidence angle $\theta_i$ (where $\theta_i$ is equal to or smaller than the critical angle $\theta_c$ and equal to or greater than the lowest obscuration angle $\theta_l$) impinge on the ring-shaped reflective region 550 of the second surface 502, and are totally reflected therefrom towards the reflective portion 520 of first surface 501. From the reflective portion 520 of the first surface 501, light rays R1 to R3 are reflected back towards the TIR region 510 of the second surface 502. In this manner, in the present invention, contrary to the conventional art, light rays having an incident angle smaller than the critical angle $\theta_c$ are also reflected off the second surface 502 and are used to improve image contrast and optimize the intensity of light collected with the optical element 500.

Referring back to FIGS. 4 and 5, light rays coming from the object point O may be classified into three groups. A first group of rays (Group I) having incidence angles between a marginal angle $\theta_m$ and the critical angle $\theta_c$, a second group of rays (Group II) having incident angles between the critical angle $\theta_c$ and a lowest angle $\theta_l$ necessary to achieve a required obscuration ratio, and a third group of rays (Group III) having incidence angles between $\theta_l$ and 0.

The optical path of light rays having an incident angle $\theta_i$ between rays having a marginal angle $\theta_m$ and the critical angle $\theta_c$ originates at the object point O and exits through the TIR region 510 of the second surface 502 of the optical element 500. Specifically, the rays of group I coming from the object point O pass through the transmissive portion 530 of the first surface 501 and undergo TIR upon impinging on the TIR region 510 of the second surface 502. These rays are also reflected by the reflective portion 520 of the first surface 501 and refracted by the TIR region 510 of the second surface 502, to thereby exit outside of the optical element 500. In other words, light rays having an incident angle $\theta_i$ between rays having a marginal angle $\theta_m$ and the critical angle $\theta_c$ undergo multiple reflections within the optical element 500 and exit therefrom substantially parallel to the optical axis AX.

The optical path of light rays having an incidence angle between $\theta_c$ and $\theta_l$ also originates at the object point O and exits through the TIR region 510 of the second surface 502 of the optical element 500. Specifically, the rays of Group II coming from the object point O pass through the transmissive portion 530 of the first surface 501 and are reflected by the ring-shaped reflective region 550 of the second surface 502. Subsequently, these rays are also reflected by the reflective portion 520 of the first surface 501 and refracted by the TIR region 510 of the second surface 502, to thereby exit outside of the optical element 500. Therefore, light rays having an incident angle $\theta_i$ between $\theta_c$ and $\theta_l$ also undergo multiple reflection within the optical element 500 and exit therefrom substantially parallel to the optical axis AX.

The optical path of rays having an angle between $\theta_l$ and 0 also originates at the object point O, but this optical path does not exit through the TIR region 510 of the second surface 502 of the optical element 500. Instead, the rays of group III pass through the circular transmissive portion 530 of the first surface 501 and are mostly be refracted by the central transmissive region 570 of the second surface 502.

Figure 6:
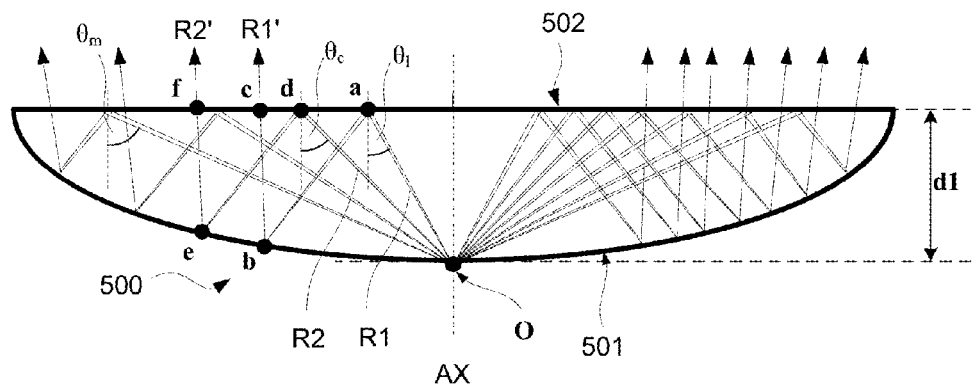
FIG. 6 illustrates optical path of light rays originated at a point object O and transmitted through the catadiotric optical element by multiple reflections.
Figure 7:
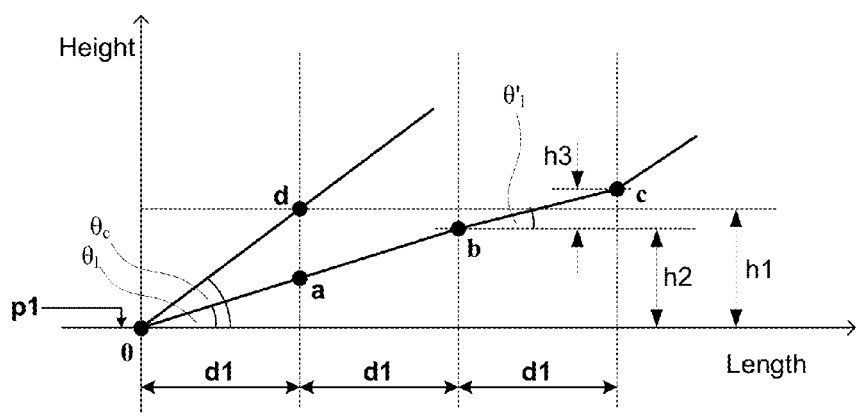
FIG. 7 illustrates a graph plotting the distances of the paraxial ray trace within the optical element.

Turning now to FIGS. 6 and 7, specific details of the optical path of light rays originated at a point object O, and exemplary dimensions of the regions in the second surface 502 of optical element 500 are described.

As illustrated in FIG. 6, a point "a" is the position where a ray R1 having an incident angle $\theta_l$ intersects with the second surface 502. A point "d" is the position where a ray R2 having an incident angle equal to the critical angle $\theta_c$ intersects with the second surface 502. The portion between the points "a" and "d" corresponds to the ring-shaped reflective region 550 of second surface 502. To ensure that the ring-shaped reflective region 550 totally reflects light rays incident thereupon regardless of the incidence angle, the portion between points "a" and "d" can be coated with a reflective film. The reflective film can be selected, for example, from a metal film such as aluminum and silver or a multilayered film. The thickness of the reflective film may be selected, for example, between tens of nanometers and hundreds of micrometers. More specifically, the thickness and material of the reflective film may be chosen in accordance with the wavelength of light to be used. A material of the catadioptric optical element 500 (lens) can be selected, for example, from crown glass, flint glass, abnormal dispersion glass, fused silica, fluorite, etc., including equivalents and combinations thereof. As noted above, the ring-shaped reflective region 550 can be fabricated by using various techniques and materials, as necessary.

The ray R1, reflected at the point "a" of the second surface 502 by the reflective coating film (not shown in FIG. 6), travels to a point "b" of the first surface 501, and thence forth exits the optical element 500 through a point "c" on the second surface 502. The ray R2 having an incident angle equal to critical angle $\theta_c$ (angle between the normal to the surface 502 and the light ray incident thereupon) travels from the object point O to a point "d" of the second surface 502; from the point "d" the ray R2 travels to a point "e" on the reflective portion 520 of the first surface 501; thence forth, the ray R2 travels to a point "f" on the second surface 502, to thereby exit outside the optical element 500. When a thickness of the optical element 500 is d1 (d1>0) and a curvature radius is r1 (r1>0), the following relational expression defined by Equation (6) should be satisfied.

$$\frac{r_1}{d_1} \geq \frac{4\tan\theta_l}{3\tan\theta_l - \tan\theta_c} \quad (6)$$

FIG. 7 shows a graph plotting the distances of the paraxial ray trace within the optical element 500. Specifically, in FIG. 7, the ordinate represents a distance from the optical axis AX in a direction orthogonal thereto along the second surface 502, and the abscissa represents a cumulative traveling distance of the rays from object point O to the exit point on the second surface 502. Accordingly, the apex of the first surface 501 is regarded as zero (the origin of the optical paths). In reality, the object point O may be located at a point p1 slightly different from the actual origin shown in the graph, but when the distance between p1 and the origin is much smaller than the thickness d1 of the optical element, point p1 can be regarded as good approximation of the origin of the graph.

With the Cartesian coordinates defined by FIG. 7, the points "a", "b", "c", and "d" of FIG. 7 can be considered substantially corresponding to the each point a, b, c, and d of FIG. 6. Specifically, the ray R1 with an incident angle $\theta_l$ will first travel an approximate distance d1 to be reflected at point "a"; from there the ray R1 will travel again an approximate distance d1 to be reflected from point "b"; at point "b" due to the curved shape of the first surface 501 ray R1 changes the incident angle to $\theta_l'$. Thus, ray R1 now travels one more time an approximate distance d1 to exit from the second surface 502 of the optical element 500 at point "c". Since a ray R2 having an incident angle equal to the critical angle $\theta_c$ can be considered to have also traveled an approximate distance d1 from the point object O to the point "d", the following approximations can be made.

Specifically, according to FIG. 7, "h1", "h2", and "h3" are defined by Equations (7) to (9), which are based on general trigonometry, as follows. Since a counterclockwise angle is defined as a positive value, the angles $\theta_c$, $\theta_l$, and $\theta_l'$ are negative values.

$$h1 = -d1 \cdot \tan\theta_c \quad (7)$$

$$h2 = -2 \cdot d1 \cdot \tan\theta_l \quad (8)$$

$$h3 = -d1 \cdot \tan\theta_l' \quad (9)$$

Now, considering the refractive index N of the optical element 500, a power of the first surface 501 can be defined as $\phi = 2N/r1$ (where N is a refractive index of the optical element). The angle of the ray R1 having the incidence angle $\theta_l$, which has traveled from the origin (position of object O) to point "a" and "b", will be changed by the first surface 501 as explained above. The amount of the angle change ($\alpha' - \alpha$) is equal to "h2·$\phi$" as derived below by Equations (10) to (12).

$$\alpha' = \alpha + h2 \cdot \phi \quad (10)$$

$$\alpha' = N \cdot \tan\theta_l' \quad (11)$$

$$\alpha = N \cdot \tan\theta_l \quad (12)$$

In FIG. 7, the height of point "c" should be equal to or higher than "h1" so that the ray at the point "c" can exit outside of the optical element 500 through the second surface 502. In short, the following Equation (13) should be satisfied.

$$h2 + h3 \geq h1 \quad (13)$$

From Equation (13) and using the values established by FIG. 7, the following Equations (14) to (16) can be further derived.

$$(-2 \cdot d1 \cdot \tan\theta_l) + (-d1 \cdot \tan\theta_l') \geq -d1 \cdot \tan\theta_c \quad (14)$$

$$(-2 \cdot d1 \cdot \tan\theta_l) + (-d1)(\tan\theta_l - 4\tan\theta_l \cdot d1/r) \geq -d1 \cdot \tan\theta_c \quad (15)$$

$$4 \cdot \tan\theta_l \cdot d1/r_1 \geq 3 \cdot \tan\theta_l - \tan\theta_c \quad (16)$$

In the inequality defined by Equation (16), since the left side is negative, the right side should be negative (i.e., 3·tan $\theta_l$ – tan $\theta_c$ < 0). Finally, the following relation defined by Equation (17), which is the above postulated Equation (6), can be obtained.

$$\frac{r_1}{d_1} \geq \frac{4\tan\theta_l}{3\tan\theta_l - \tan\theta_c} \quad (17)$$

Based the above relation of Equation (17), and using certain values of a practical example shown FIG. 8, the following values can be obtained.

Case 1: $\theta_c = -34.3$ deg when N=1.773. When $r_1 = 143$ mm, d1=35.0 mm, and $\theta_l = -19.0$ deg, the inside diameter of the ring-shaped reflective region 550 of the second surface 502 is 12.1 mm, and the outside diameter is 23.9 mm. In this case, when the incidence angle of the marginal ray (marginal ray angle) $\theta_m$ is −68.5 deg corresponding to a NA of 1.65, the obscuration of this example based on Equation 5 becomes 35.8%.

When the first surface 501 of the optical element 500 is an aspheric surface, the actual obscuration is 38% by calculating real ray trace. Accordingly, although there is a minor difference between the values calculated with the above approximation and the actual measured values, it is seen that the relation defined by Equation (17) gives a good approximation for establishing the dimensions of the ring-shaped reflective region 550 of the second surface 502.

Case 2: When $r_1 = 278$ mm, d1=45.0 mm, and $\theta_l = 16.7$ deg, the inside diameter of the ring-shaped reflective region 550 on the second surface 502 is 13.5 mm, and the outside diameter is 30.7 mm. When the marginal ray angle $\theta_m$ is 68.5 deg corresponding to NA of 1.65, the obscuration of this example is 30.9%.

In contrast, when the ring-shaped reflective region 550 is not provided on the second surface 502, that is, when $\theta_l = \theta_c$ (=−34.3 deg) in Equation (3), the obscuration of this example becomes 60.6%.

<Modifications>

In the foregoing description, the ring-shaped reflective region 550 has been described as being advantageous to extend the TIR region 510 of the second surface 502 towards the optical axis AX. Optionally, however, the ring-shaped reflective region 550 may be extended over the area of the TIR region 510.

As shown in FIG. 3, the second surface 502 can be generally planar. In alternate embodiments, however, the second surface 502 may be convex or concave. That is, as stated above, the optical element 500 can be shaped as plano-convex lens (as described above), or it can also be shaped as a meniscus lens, biconvex lens, or other shapes.

In the case where the second surface 502 is shaped as a concave surface, light is reflected more downward compared to case of a flat surface, and the area of the ring-shaped reflective region 550 in FIG. 3 may be enlarged because the incident angle of the ray is reduced according to curvature radius of the second surface 502.

A concave surface as the second surface 502 might have a disadvantage in light of the obscuration. On the other hand, using a convex surface can be advantageous as to obscuration. A second surface 502 having a convex shape may cause repeated TIR at the edge thereof when light comes to the second surface 502 a second time after reflecting off the first surface 501. Moreover, the diameter of the optical element 500 might be increased dramatically as the concave shape becomes steep.

For example, in a case where the second surface 502 has convex shape whose radius of curvature is 1000 mm, the inside diameter of the ring-shaped reflective region 550 is 11.6 mm, and the outside diameter is 23.6 mm. In this case, the obscuration of this example is 33.0%. Accordingly, by making the second surface 502 of a convex shape, the diameter of the optical element 500 becomes 10 mm larger than when the second surface 502 is made flat.

In contrast, when the second surface 502 is shaped in a concave shape whose radius of curvature is −1000 mm, the inside diameter of the ring-shaped reflective region 550 is 14.4 mm, and the outside diameter is 25.8 mm. In this case, the obscuration of this example is 40.0%. Advantageously, therefore, when the second surface 502 is made in a concave shape the diameter of the optical element 500 becomes 8 mm smaller than when the second surface 502 is made flat.

In summary, therefore, the above described catadioptric optical element 500 can be implemented in various forms, and it is not limited to any specific one shape. The specific implementation will depend on the desired application. For example, the above explained catadioptric optical element can be used in combination with other lenses or mirrors.

FIG. 8 illustrates an example of how the catadioptric optical element 500 can be integrated with other optical elements to implement an imaging optical system 600. More specifically, as illustrated in FIG. 8, the catadioptric optical element 500 can be combined with a lens group 610 including a lens unit 605 to form, at an image plane IP, an image IM of an object O disposed on the optical axis AX at an object plane OP of the optical system 600.

Numerical Example

Data corresponding to a numerical example (Numerical Example 1) representative of the optical system 600 illustrated in FIG. 8 is next discussed. In the numerical example presented herein, the reference indicia "i" (where i=1, 2, 3 . . . ) denotes the order of surfaces in the optical system from the object plane to the image plane. With this premise, the "Radius" data $R_i$ corresponds to an $i^{th}$ radius of curvature (at the $i^{th}$ plane); thickness $T_i$ denotes an on-axis distance or space between the ith and $(i+1)^{th}$ surface; the reference $ndi$ and $vdi$ respectively denote the index of refraction and Abbe number of the material of the $i^{th}$ optical element with respect to the Fraunhoffer d-line. A surface number without data for $ndi$ and $vdi$ indicates that this surface number represents an air space. In Table 1, a radius R=1.00E+18 (where 1E+X is equivalent to $1\times10^{+X}$) denotes a substantially infinite radius, i.e., a flat surface. In addition, in the numerical example, it is assumed that the object O is located on the object side of the first surface 501 and at an object plane OP (as shown in FIG. 3). The object O is considered to be immersed in an immersion medium (oil) having a refractive index matching the refractive index of circular transmissive portion of the first optical surface 501 (i.e., matching the refractive index of the optical element 500). Where present, aspherical surfaces are denoted by an asterisk ("*") added next to the surface number.

TABLE 1 parameters of the optical components corresponding to optical system 600 (FIG. 8).

| Surface | Radius | Thickness | ndi | vdi |
|---|---|---|---|---|
| 1 | 1.00E+18 | 1.000 | 1.773 | 49.56 |
| 2* | 142.975 | 35.000 | 1.773 | 49.56 |
| 3 | 1.00E+18 | −35.000 | 1.773 | 49.56 |
| 4* | 142.975 | 35.000 | 1.773 | 49.56 |
| 5 | 1.00E+18 | 0.000 | | |
| 6 | 1.00E+18 | 0.500 | | |
| 7 | 1.00E+18 | 5.000 | 1.752 | 31.08 |
| 8 | 1173.523 | 27.053 | 1.497 | 81.61 |
| 9 | −216.676 | 0.500 | | |
| 10 | 209.736 | 5.000 | 1.744 | 44.85 |
| 11 | 80.000 | 57.706 | 1.497 | 81.61 |
| 12 | −247.010 | 0.500 | | |
| 13 | 100.000 | 5.000 | 1.620 | 60.32 |
| 14 | 60.000 | 9.361 | 1.497 | 81.61 |
| 15 | 74.510 | 0.500 | | |
| 16 | 59.293 | 5.000 | 1.620 | 60.32 |
| 17 | 38.266 | 24.955 | 1.497 | 81.61 |
| 18* | 62.162 | 25.283 | | |
| 19 | −72.170 | 5.000 | 1.620 | 60.32 |
| 20* | −207.029 | 0.500 | | |
| 21 | 55.850 | 17.088 | 1.755 | 27.58 |
| 22 | 4882.392 | 24.632 | | |
| 23 | −65.819 | 5.000 | 1.754 | 28.88 |
| 24 | 35.987 | 14.106 | 1.487 | 70.41 |
| 25 | −37.553 | 0.500 | | |
| 26 | −47.713 | 5.000 | 1.720 | 46.84 |
| 27 | 35.413 | 5.000 | 1.755 | 27.58 |
| 28* | 346.912 | 105.817 | | |
| 29 | 56.504 | 5.000 | 1.698 | 30.33 |
| 30* | −73.567 | 10.000 | | |
| IM | 1.00E+18 | 0 | | |

In each aspheric surface, a conic constant is denoted by k; aspherical order coefficients are denoted by A, B, C, D, E, F, G, J . . . which are $4^{th}$, $6^{th}$, $8^{th}$, $10^{th}$, $12^{th}$, $14^{th}$ and $16^{th}$ order coefficient respectively; and a displacement in the direction of the optical axis at a position of height h from the optical axis is denoted by z with reference to an apex of the surface. The displacement in the aspherical surface is based on the Equation (18) given below, and values for coefficients A through J are given in Table 2.

$$z = \frac{ch^2}{1 + \sqrt{1-(1+k)c^2h^2}} + Ah^4 + Bh^6 + Ch^8 + Dh^{10} + Eh^{12} + Fh^{14} + Gh^{16} + Hh^{18} + Jh^{20} + \cdots \quad \text{Equation (18)}$$

TABLE 2

Data of aspherical surfaces in optical system 600 (FIG. 8).

| Surface | k | A | B | C | D | E | F | G |
|---|---|---|---|---|---|---|---|---|
| 2, 4 | −1.82E+00 | 4.77E−08 | −1.12E−12 | 2.29E−17 | −3.75E−21 | 4.99E−25 | −3.05E−29 | 6.98E−34 |
| 18 | 0.00E+00 | 1.60E−07 | 2.09E−11 | 1.43E−14 | 0.00E+00 | 0.00E+00 | 0.00E+00 | 0.00E+00 |
| 19 | 0.00E+00 | 2.35E−08 | −1.25E−11 | 2.24E−14 | 0.00E+00 | 0.00E+00 | 0.00E+00 | 0.00E+00 |

TABLE 2-continued

Data of aspherical surfaces in optical system 600 (FIG. 8).

| Surface | k | A | B | C | D | E | F | G |
|---|---|---|---|---|---|---|---|---|
| 28 | 0.00E+00 | 2.37E−06 | 8.02E−10 | 2.53E−13 | 0.00E+00 | 0.00E+00 | 0.00E+00 | 0.00E+00 |
| 30 | 0.00E+00 | 1.54E−06 | 1.87E−09 | −3.38E−12 | 0.00E+00 | 0.00E+00 | 0.00E+00 | 0.00E+00 |

While the various aspects of the present invention have been described with reference to exemplary embodiments, it is to be understood that the present invention is not limited to the above described embodiments. The scope of the following claims is to be accorded the broadest interpretation so as to encompass all such modifications and equivalent structures and functions.

What is claimed is:

1. A catadioptric element comprising:
a first surface on which a ray is incident; and
a second surface opposite to the first surface,
wherein the second surface has a first area in which a reflective film having a ring shape centered on an optical axis is formed, and a second area surrounding the first area,
wherein the first area is an area on which a ray emitted from an object point on the optical axis and incident on the first surface is incident at an incident angle smaller than a critical angle, and the ray incident on the first area is reflected by the reflective film towards the first surface, and
wherein the second area is an area on which a ray emitted from an object point on the optical axis and incident on the first surface is incident at an incidence angle greater than a critical angle, and the ray incident on the second area is totally reflected by the second surface towards the first surface by total internal reflection.

2. The catadioptric element according to claim 1, wherein the first surface is concave towards the second surface, and the second surface is flat.

3. The catadioptric element according to claim 1, wherein a line which goes through a first center position of the first surface and a second center position of the second surface is perpendicular to the second surface.

4. The catadioptric element according to claim 2, wherein when $\theta_c$ is a critical angle for the second surface, $\theta_l$ is an angle between the optical axis and a ray incident on the first area, $r_1$ is a curvature radius of the first surface, and $d_1$ is a thickness of the catadioptric element on the optical axis, the following condition is satisfied $$\frac{r_1}{d_1} \geq \frac{4 \tan \theta_l}{3 \tan \theta_l - \tan \theta_c}.$$

5. An optical system to form an image comprising,
the catadioptric element according to claim 1, and a lens unit to form the image of an object from rays collected by the catadioptric element.

6. The catadioptric element according to claim 1,
wherein the first surface has a transmissive portion including the optical axis, and a reflective portion surrounding the transmissive portion.

7. The catadioptric element according to claim 6, wherein a ray reflected by the second surface is reflected by the reflective portion towards the second surface.

8. The catadioptric element according to claim 1, wherein the second surface has a transmissive region including the optical axis and is configured to determine an obscuration ratio.

9. The catadioptric element according to claim 1, wherein the second area is configured to reflect a ray having an incidence angle greater than a critical angle $\theta_c$ and equal to or lower than a marginal angle $\theta_m$.

10. The catadioptric element according to claim 1, wherein the first area is configured to reflect a ray having an incidence angle smaller than the critical angle $\theta_c$ and equal to or greater than a lowest obscuration angle $\theta_l$.

* * * * *